May 12, 1936. C. A. TAYLOR 2,040,451
FLUID PRESSURE BRAKE DEVICE
Filed March 1, 1934
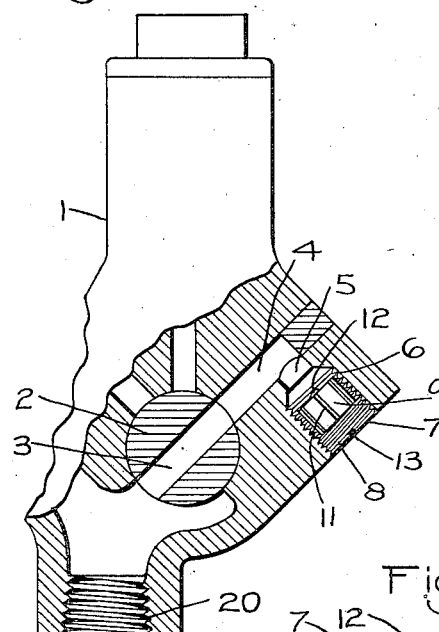
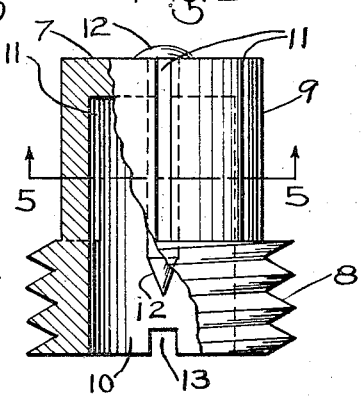
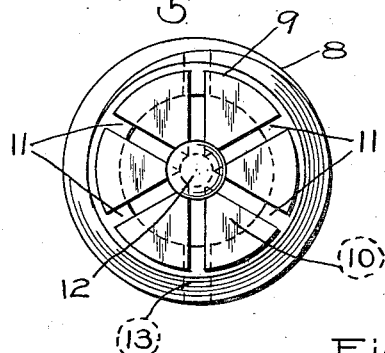
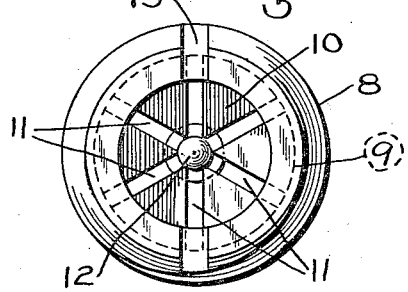
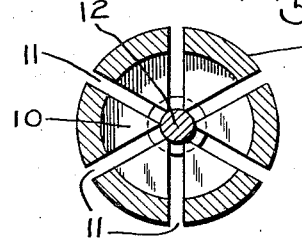
INVENTOR
CLYDE A. TAYLOR
BY Wm. M. Cady
ATTORNEY Patented May 12, 1936

2,040,451

UNITED STATES PATENT OFFICE 2,040,451

FLUID PRESSURE BRAKE DEVICE

Clyde A. Taylor, Chicago, Ill., assignor to The Westinghouse Air Brake Company, Wilmerding, Pa., a corporation of Pennsylvania Application March 1, 1934, Serial No. 713,492

17 Claims. (Cl. 303—1)

This invention relates to fluid pressure brakes, and more particularly to retaining valve devices of the character employed on railway cars for controlling the release of fluid under pressure from the brake cylinder on the cars.

The usual retaining valve device is provided internally with vent passages which lead to an atmospheric exhaust passage of larger diameter than the internal passages, and this exhaust passage is screw-threaded to receive the screw-threaded pipe stud of a pressure gage, so that a pressure gage may be mounted on the retaining valve device for ascertaining certain leakage conditions of the brake equipment.

Insects, such as mud wasps, often enter the retaining valve device through the screw-threaded exhaust passage and travel on into the smaller diameter vent passages within the device and there build a nest, the screw-threaded exhaust passage apparently being too conspicuous and too large in diameter for this purpose. These nests often seal up the vent passage in the device so that when a car is in service, the wasp nest prevents the release of brakes which often results in sliding or otherwise damaging of the wheels on a car.

One object of my invention is to provide an improved exhaust fitting adapted to be applied to the screw-threaded exhaust passage of a retaining valve device for obviating the above difficulty but which will in no way interfere with the normal functioning of the fluid pressure brake system.

Another object of my invention is to provide an improved exhaust fitting for a retaining valve device which will be contained wholly within the body of the retaining valve device for the purpose of protecting the fitting against becoming broken or damaged from external blows or from the use of a tool such as a pipe wrench to apply or remove the fitting, also for protecting the fitting from becoming clogged with dust, dirt, snow, sleet and the like, and further for rendering the fitting inconspicuous and therefore not liable to be stolen, since the fitting might be made from brass or some such metal which resists corrosion.

Other objects and advantages will be apparent from the following more detailed description of my invention.

In the accompanying drawing; Fig. 1 is a view, partly in section, of a pressure retaining valve device with my improved exhaust fitting applied thereto; Fig. 2 is an enlarged side elevational view of my improved exhaust fitting; Fig. 3 is an enlarged plan view of one end of the fitting; Fig. 4 is an enlarged plan view of the opposite end of the fitting; and Fig. 5 is a sectional view taken on the line 5—5 of Fig. 2.

As shown in Fig. 1 of the drawing, the retaining valve device is of the usual construction comprising a casing 1 having a screw-threaded passage 20 adapted to be connected to the usual retaining valve pipe on a car. A plug valve 2 is rotatably mounted in the casing and is provided with a port 3 adapted at one time to establish communication from the screw-threaded passage 20 to vent passages 4 and 5, the passage 5 opening into the usual screw-threaded exhaust passage 6 which is of larger diameter than that of passages 4 and 5 and which leads directly to the atmosphere. An exhaust fitting 7 constructed in accordance with my invention is shown screw-threaded into the exhaust passage 6.

As shown in Figs. 2 to 5, the exhaust fitting 7 comprises a screw-threaded portion 8 adapted to be threaded into the threads of the exhaust passage 6 of the retaining valve device, and a cylindrical portion 9 projecting from one end of the threaded portion and adapted to be disposed in the exhaust passage 6 back of the threaded portion 8. The overall length of the threaded portion 8 and cylindrical portion 9 is less than the length of the exhaust passage 6, and the diameter of the cylindrical portion is less than the root diameter of the threads of the threaded portion, so that when the fitting is applied to the retaining valve device with the outer face of the threaded portion flush with the outer surface of casing 1, there will be free communication from passage 5 to the space between the cylindrical portion 9 and the side wall of the passage 6.

The exhaust fitting is provided with an axial bore 10 which is open at the outer face of the threaded portion but closed at the outer face of the cylindrical portion, and a plurality of openings, preferably in the form of six radial slots 11, are provided through the side and closed end of the cylindrical portion 9 for establishing communication between bore 10 and the space around the outside of the cylindrical portion 9, which space is open to the vent passage 5. The width of these slots is not sufficient to permit passage of mud wasps and the like to the internal passages of the retaining valve device, and since the slots are entirely enclosed within the casing 1 of the retaining valve device they are protected against damage from blows and from being stopped up by foreign matter such as dust, snow or sleet. The combined flow capacity of all of the slots 11 in the cylindrical portion of the fitting and the flow capacity of bore 10 is greatly in excess of that required to permit proper release of the brakes on a car, so that even if one or more of the slots 11 should for any reason become clogged, the fitting will in no way interfere with the proper functioning of the brake equipment.

The bore 10 in the fitting is too conspicuous and not of sufficient depth to permit a wasp to build a nest and seal up the bore. However, as a further precaution against insects attempting to build a nest in bore 10, I provide a pointed pin 12 which is secured in an axial bore in the closed end of the cylindrical portion 9 of the fitting, said pin extending nearly to the open end of the bore and being pointed so as to tend to drive insects away in case they should fly against the pointed end of said pin.

A screw driver slot 13 is provided across the outer face of the threaded portion 8 to facilitate the application and removal of the fitting to and from the exhaust passage 6 of the retaining valve device, and the bottom of said slot is a sufficient distance from the pointed end of pin 12 that a screw driver, when applied to said slot, will not engage and thereby damage the end of said pin.

A particular advantage in placing the fitting 7 entirely within the retaining valve body and having to use a screw driver for applying and removing same is that it precludes possible damage to the fitting which might result from the use of tools such as pipe wrenches which might be used if the fitting were such as to extend out from the body of the retaining valve device. This construction also provides better protection to the fitting against being damaged or broken off by external blows, and against becoming clogged with dust, dirt, snow, sleet or other foreign matter. Furthermore, by placing the fitting inside of the exhaust passage, it is less conspicuous than if it extended out from the retaining valve body and therefore is less liable to become stolen.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, a valve device having a fluid pressure outlet passage, a fitting wholly secured within said passage and having a central chamber, and a plurality of openings establishing communication between said chamber and said passage.

2. In a fluid pressure brake, a valve device having a fluid pressure outlet passage, a hollow cylindrical fitting having screw-threaded engagement in said passage and disposed wholly within said passage, and a plurality of openings establishing communication between said passage and the cavity in said cylindrical fitting.

3. In a fluid pressure brake, a valve device having a fluid pressure outlet passage, a cylindrical fitting secured wholly within said passage and having a central chamber open at its outer end and closed at its inner end, said fitting being provided with a plurality of slots connecting said chamber with said passage.

4. In a fluid pressure brake, a valve device having a fluid pressure outlet passage, a fitting having an outer portion secured entirely within said passage, and an inner portion carried by said outer portion and disposed in said passage to the rear of said outer portion, a bore extending through said outer portion, and a plurality of openings through said inner portion establishing communication from said bore to said passage.

5. In a fluid pressure brake, a valve device having a fluid pressure outlet passage, a fitting having an outer portion secured entirely within said passage and an inner portion of smaller diameter than said passage and disposed in said passage to the rear of said outer portion, a bore extending through said outer portion, and a plurality of openings through said inner portion establishing communication from said bore to the space outside of said inner portion.

6. In a fluid pressure brake, a valve device having a fluid pressure outlet passage, a fitting disposed entirely within said passage and having an outer portion screw-threaded into said passage and an inner portion of smaller diameter than said passage and disposed in said passage to the rear of said screw-threaded outer portion, a bore extending through said outer portion and into said inner portion, and a plurality of slots through said inner portion establishing communication between said bore and the space outside of said inner portion.

7. In a fluid pressure brake, a valve device having a fluid pressure outlet passage, a fitting having an outer portion secured entirely within said passage and an inner portion of smaller diameter than said passage and disposed in said passage to the rear of said outer portion, a bore extending through said outer portion and into said inner portion, and a plurality of radial slots through the end of said inner portion and extending through the side wall of said inner portion and establishing communication from said bore to the space outside of said inner portion.

8. In a fluid pressure brake, a valve device having a fluid pressure outlet passage, a cylindrical fitting secured wholly within said passage and having an axial chamber closed at its inner end, a plurality of openings connecting said chamber to said passage, and a pin carried by said fitting restricting entrance to said bore.

9. In a fluid pressure brake, a valve device having a fluid pressure outlet passage, a cylindrical fitting secured wholly within said passage and having an axial chamber closed at its inner end, a plurality of openings connecting said chamber to said passage, and a pin carried by said fitting and disposed axially in said bore, the free end of said pin being pointed.

10. In a fluid pressure brake, a valve device having a screw-threaded fluid pressure outlet passage, a cylindrical fitting having screw-threaded engagement with and disposed wholly within said passage, said fitting having a cavity open at the outer face of said fitting, a plurality of openings establishing communication from said cavity to said passage, and a slot across the outer face of said fitting for applying and removing said fitting to and from said passage.

11. In a fluid pressure brake, a valve device having a screw-threaded fluid pressure outlet passage, a cylindrical fitting having screw-threaded engagement with and disposed wholly within said passage, said fitting having an axial chamber open at the outer face of said fitting, a plurality of openings establishing communication from said chamber to said passage, a slot across the outer face of said fitting to receive the end of a screw driver, and a pin carried by said fitting and projecting axially into said chamber to a point slightly spaced from a plane including the bottom of said slot.

12. In a fluid pressure brake, a valve device having a fluid pressure outlet passage, a fitting disposed wholly within said passage and secured to said valve device, and a plurality of slots in said fitting through which an outlet communication is established from said passage.

13. In a fluid pressure brake, a valve device having a fluid pressure outlet passage, a fitting disposed wholly within said passage and secured to said valve device, and at least one narrow slot in said fitting through which an outlet communication is established from said passage.

14. In a fluid pressure brake, a valve device having a fluid pressure outlet passage, a fitting having an outer portion secured entirely within said passage and an inner portion of smaller diameter than said passage and disposed in said passage to the rear of said outer portion, a bore extending through said outer portion, and at least one narrow slot through said inner portion establishing communication from said bore to the space outside of said inner portion.

15. An exhaust fitting for insertion wholly within exhaust ports of fluid pressure brake apparatus and the like, comprising an elongated body having a bore therein open at one end and closed at the other end, said body having threads extending for a portion of the length thereof and a smooth exterior surface contiguous to said threaded portion and extending for the remainder of the length thereof, and at least one narrow slot extending through said smooth exterior surface and establishing communication between said bore and the atmosphere.

16. An exhaust fitting for insertion wholly within exhaust ports of fluid pressure brake apparatus and the like, comprising an elongated body having a bore therein open at one end and closed at the other end, said body having threads extending for a portion of the length thereof and a smooth exterior surface contiguous to said threaded portion and extending for the remainder of the length thereof, said threaded portion of said body being of larger diameter than said smooth surface portion, and at least one narrow slot extending through said smooth exterior surface and establishing communication between said bore and the atmosphere.

17. An exhaust fitting for insertion wholly within exhaust ports of fluid pressure brake apparatus and the like, comprising an elongated body having a bore therein open at one end of said body and closed at the opposite end, said body having threads for a portion of its length and a smooth exterior surface contiguous to said threaded portion and extending for the remainder of its length, and at least one narrow slot through said opposite end establishing communication through said opposite end to said bore, said body having a screw driver slot across one end.

CLYDE A. TAYLOR.